US008443940B2

(12) United States Patent
Kelly et al.

(10) Patent No.: US 8,443,940 B2
(45) Date of Patent: May 21, 2013

(54) PROCESS AND STRUCTURE FOR SERVICING A VEHICLE OVER A SERVICE PIT

(76) Inventors: James W. Kelly, Macomb, MI (US);
Denise C. Kelly, Macomb, MI (US)

( * ) Notice: Subject to any disclaimer, the term of this patent is extended or adjusted under 35 U.S.C. 154(b) by 0 days.

(21) Appl. No.: 13/524,633

(22) Filed: Jun. 15, 2012

(65) Prior Publication Data

US 2012/0247873 A1  Oct. 4, 2012

Related U.S. Application Data

(63) Continuation of application No. 12/262,963, filed on Oct. 31, 2008, now Pat. No. 8,256,357.

(60) Provisional application No. 61/109,237, filed on Oct. 29, 2008.

(51) Int. Cl.
*F16N 33/00* (2006.01)

(52) U.S. Cl.
USPC .......................................................... 184/1.5

(58) Field of Classification Search
USPC .................. 184/1.5; 108/55.5; 254/88–90
See application file for complete search history.

(56) References Cited

U.S. PATENT DOCUMENTS

| | | | | |
|---|---|---|---|---|
| 1,654,073 A * | 12/1927 | Fagan | ............................. | 184/1.5 |
| 4,077,607 A * | 3/1978 | Lovelady | ........................ | 254/88 |
| 4,324,384 A * | 4/1982 | Elser | ............................. | 254/8 B |
| 4,531,712 A * | 7/1985 | Christian et al. | ................ | 254/88 |
| 4,662,020 A * | 5/1987 | Wilkerson | ........................ | 14/2.4 |
| 4,789,047 A * | 12/1988 | Knobloch | ....................... | 184/1.5 |
| 4,796,537 A * | 1/1989 | Besser | ............................ | 104/37 |
| 5,701,706 A * | 12/1997 | Kreysler et al. | .............. | 52/169.6 |
| 5,833,294 A * | 11/1998 | Williams et al. | ........... | 296/24.32 |
| 6,092,787 A * | 7/2000 | Nayman | ..................... | 254/10 R |
| 6,095,746 A * | 8/2000 | Bergin | ........................... | 414/430 |
| 6,102,370 A * | 8/2000 | Johnston | .................... | 254/89 H |
| 6,173,941 B1 * | 1/2001 | Johnston | ..................... | 254/89 H |
| 6,345,693 B1 * | 2/2002 | Yeo et al. | ....................... | 187/211 |
| 6,467,746 B1 * | 10/2002 | Paskiewicz | ................ | 248/349.1 |
| 6,772,997 B2 * | 8/2004 | Keaton et al. | .................... | 254/90 |
| 6,935,619 B2 * | 8/2005 | Chamoun | .................... | 254/10 B |
| 7,033,119 B2 * | 4/2006 | Baker et al. | ...................... | 410/66 |
| 7,195,106 B2 * | 3/2007 | Heynssens | .................... | 187/244 |
| 7,874,057 B1 * | 1/2011 | Rickards | ......................... | 29/430 |

* cited by examiner

*Primary Examiner* — William E Dondero
*Assistant Examiner* — Michael Riegelman
(74) *Attorney, Agent, or Firm* — Gifford, Krass, Sprinkle, Anderson & Citkowski, P.C.

(57) ABSTRACT

A support for a non-automotive vehicle to be placed over a service pit and allow for servicing of the vehicle is disclosed. In addition, a process far servicing the vehicle is also disclosed. The support can include as support surface that has an engine access opening, a rolling mechanism attached to the support surface that affords for the support surface to roll over a surface at a predetermined height and at least one ramp attached to the support surface. The at least one ramp can be movable between a retracted position and an extended position and the support is dimensioned to roll over the service pit and allow for servicing of the non-automotive vehicle engine. In some instances, the support affords for the non-automotive vehicle to have its oil changed.

11 Claims, 5 Drawing Sheets

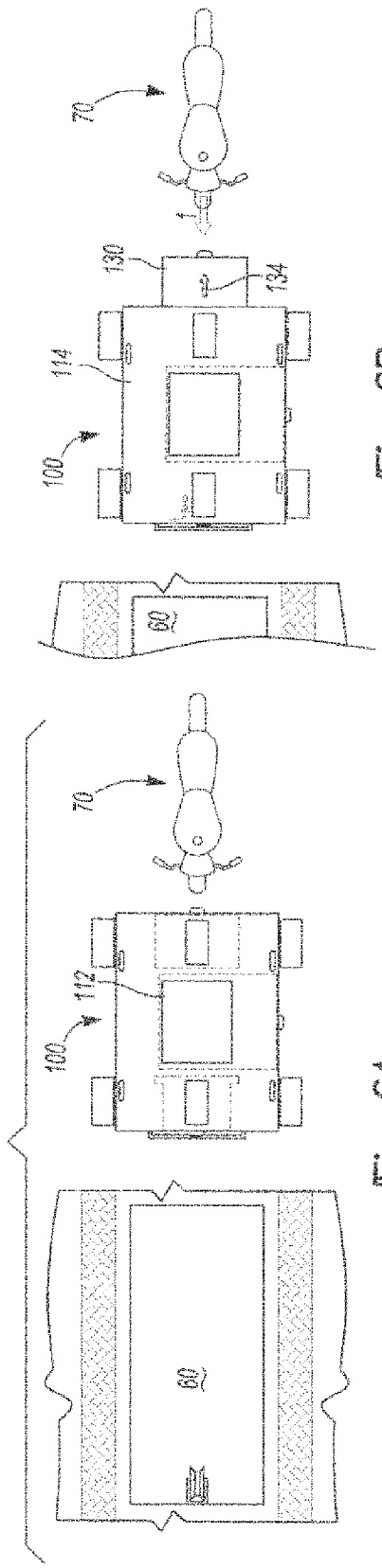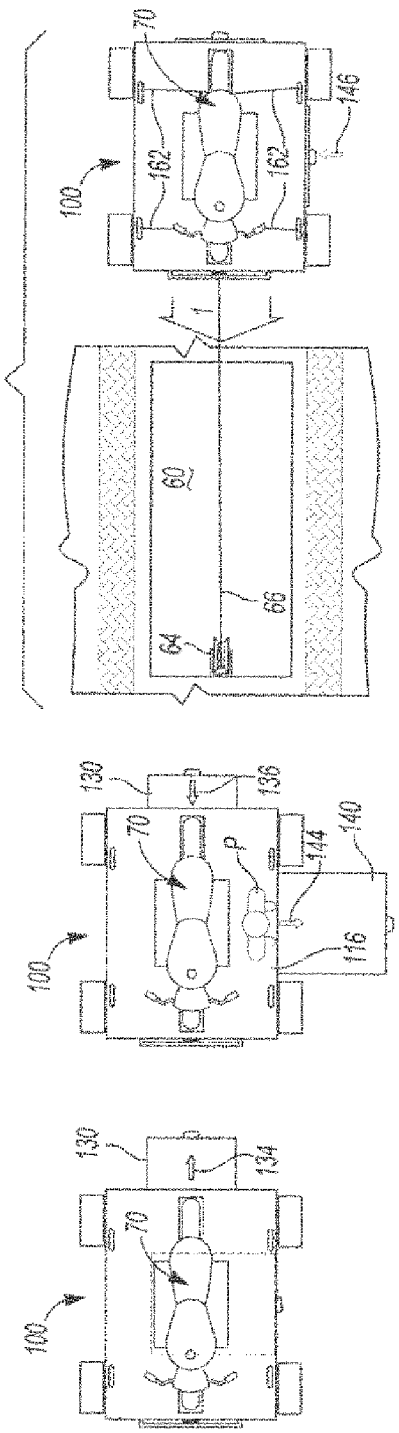

PROCESS AND STRUCTURE FOR SERVICING A VEHICLE OVER A SERVICE PIT

CROSS-REFERENCE TO RELATED APPLICATIONS

This application is a divisional application of U.S. patent application Ser. No. 12/262,963 which claims priority of U.S. Provisional Patent Application Ser. No. 61/109,237 filed Oct. 29, 2008, both of which are incorporated herein by reference.

FIELD OF THE INVENTION

This invention relates generally to servicing a motor vehicle above a service pit. More specifically, the invention relates to changing the oil of a non-automotive vehicle over a service pit.

BACKGROUND OF THE INVENTION

Quick lube facilities, also known as quick oil change facilities, are well known. Such facilities allow a driver of a motor vehicle such as an automobile and/or truck to drive the vehicle over a service pit, at which time at least one individual within the service pit services the vehicle from beneath the engine. For example, the individual can remove the oil drain plug from the engine and allow oil to drain therefrom. After the oil has been drained, the individual can replace the oil drain plug and new oil can he placed or poured into the engine. In addition, the individual can remove the oil filter and replace it with a new oil filter and thereby provide and timely and cost efficient oil change for the driver.

Other types of motorized vehicles besides automobiles and trucks can be used by individuals for transportation, entertainment, work and the like. For example, motorcycles, scooters, all-terrain vehicles, riding lawnmowers and the like, hereafter referred to as non-automotive vehicles, are common and also need regular engine maintenance. In order to service the engine of such a vehicle, individuals have had to perform the work themselves or take the non-automotive vehicle to a specialty shop where work on particular types of vehicles is performed. For example, a motorcycle shop is typically where an individual will take his or her motorcycle, scooter and the like in order to have its oil changed. However, such types of facilities typically do not afford for a timely and cost efficient process for servicing such a vehicle. Therefore, a process and/or structure that would allow an individual to take a non-automotive type vehicle to a quick lube facility and have the vehicle serviced would he desirable.

SUMMARY OF THE INVENTION

A support for a non-automotive vehicle, hereafter also referred to as a "vehicle", to be placed over a service pit and allow for servicing of the vehicle is disclosed. in addition, a process for servicing the vehicle is also disclosed. The support can include a support surface that has an engine access opening, a rolling mechanism attached to the support surface that affords for the support surface to roll over a surface at a predetermined height and at least one ramp attached to the support surface. The at least one ramp can be movable between a retracted position and an extended position and the support is dimensioned to roll over the service pit and allow for servicing of the non-automotive vehicle engine. In some instances, the support affords for the non-automotive vehicle to have its oil changed.

The rolling mechanism can be a plurality of wheels that are rotatably attached to the support surface and the at least one ramp can be a rear ramp, a side ramp and a front ramp. The rear ramp in the extended position can provide an inclined surface extending from a rear portion of the support surface to a floor surface. The inclined surface of the rear ramp affords for rolling the non-automotive vehicle onto the support surface. The side ramp can be a cover of and/or block the engine access opening of the support surface in the retracted position and provide an inclined surface extending from a side portion of the support surface to the floor surface in the extended position. The inclined surface of the side ramp provides an aid for an individual to step off of the support surface. The front ramp can have an upright extended position and a down extended position. When in the upright extended position, the front ramp is a generally vertical surface extending upwardly from a front portion of the support surface, the generally vertical surface operable to aid in preventing the non-automotive vehicle from rolling off of the support surface. When the front ramp is in the down extended position, it provides an inclined surface extending from a front portion of the support surface to a floor surface such that the vehicle can be rolled off of the support. The support can also include tie-down links that afford for tie-down straps to be used to secure the vehicle onto the support. In addition, a bracket or stand can extend from the support surface and be operable to secure the vehicle to the support, hold the vehicle on the support and the like.

The process for servicing the non-automotive vehicle can include providing a service pit with a top opening that has a width. A non-automotive vehicle with an engine is provided along with a support that is dimensioned to support the vehicle and to generally span across the width of the service pit top opening. The support can have an engine access opening that provides access to the underside of the vehicle engine. The support and the vehicle are placed over the pit such that the support spans the width of the top opening and supports, holds, etc. the vehicle over the service pit. In addition, the engine access opening of the support can be located underneath the vehicle engine and in some instances directly beneath the oil drain plug. Thereafter, the engine of the vehicle is serviced. For example, the oil drain plug of the engine is removed, the oil is drained from the engine, the oil drain plug is replaced and new oil is placed in the engine. After the vehicle is serviced, it is removed from over the service pit. In some instances, the service pit is located at a quick tube facility.

BRIEF DESCRIPTION OF THE DRAWINGS

FIGS. 6A-6H illustrate a process for changing the oil of a motorcycle over a service pit at a quick lube facility using the embodiment shown in FIGS. 1-3.

DETAILED DESCRIPTION OF THE INVENTION

Figure 1:
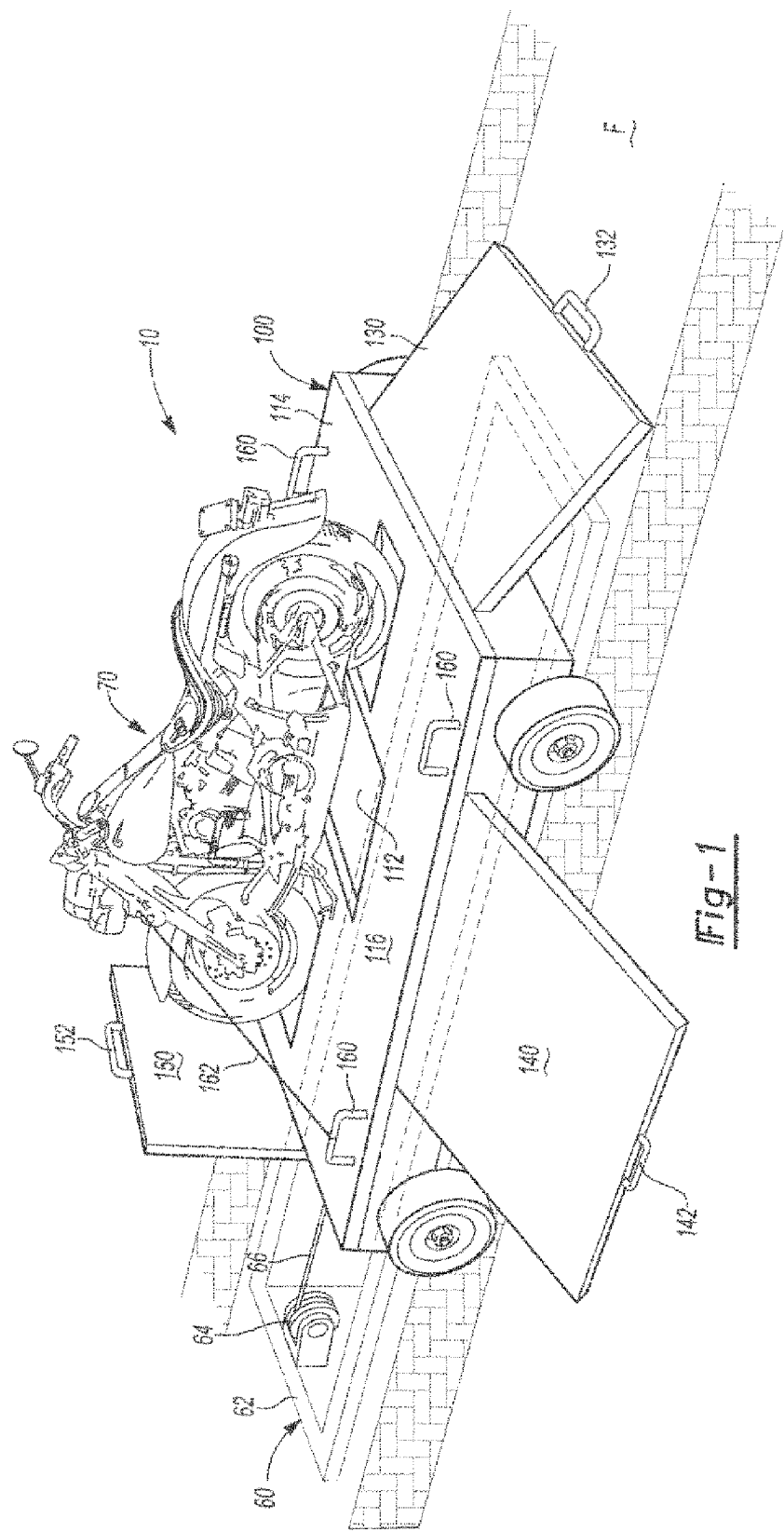
FIG. 1 is a perspective view of an embodiment of the present invention illustrating a motorcycle being supported over a service pit.

The present invention discloses a structure and a process for servicing a non-automotive vehicle, hereafter also referred to as a "vehicle", over a service pit. As such, the structure and/or the process have utility as a component and/or a process for changing the oil of a non-automotive vehicle. For the purposes of the present invention, the term "non-automotive vehicle" includes vehicles such as motorcycles, scooters, three-wheel all-terrain vehicles, four-wheel all-terrain vehicles, six-wheel all-terrain vehicles, riding lawnmowers and the like.

A support for a non-automotive vehicle to be placed over a service pit and allow for servicing of the vehicle can include a support surface that has an engine access opening therewithin. Servicing of the vehicle can include, but is limited to, changing the oil, checking and/or adjusting the tire air pressure, washing a windshield, performing a safety check, checking and/or replacing light bulbs and the like. The engine access opening affords for access to an underside of an engine of the vehicle and in some instances allows access to an oil drain plug, oil filter and the like of the engine. The support can also include a rolling mechanism attached to the support surface, the rolling mechanism operable for the support surface to roll over a surface at a predetermined height. In this manner, the support surface can roll over a service pit and support the vehicle over the pit.

At least one ramp can be attached to the support surface, the at least one ramp having and being movable between a retracted position and an extended position. The support can also include a tie-down link and/or a bracket that affords for secure holding of the non-automotive vehicle on the support while it is being serviced. The rolling mechanism can be a plurality of wheels that are rotatably attached to the support surface, however it is appreciated that the support surface can also be moved over the service pit by sliding, picking the support surface up and placing it over the service pit and the like. In addition, a hoist can he used to move and/or support the support surface over the service pit and the support surface can be moved over the pit by an automated mechanical means.

The at least one ramp can include a rear ramp, a side ramp and a front ramp. The ramps can have a retracted position such that they are stored on top of and/or underneath the support surface. The rear ramp in the extended position can provide an inclined surface that extends from a rear portion of the support surface to a floor surface. Such an inclined surface is operable to aid in rolling the non-automotive vehicle onto the support surface. The side ramp can cover and/or block the engine access opening of the support surface when it is in the retracted position and provide an inclined surface extending from a side portion of the support surface to the floor surface when in an extended position. The inclined surface of the side ramp provides an aid for an individual to step off of the support surface. For example and for illustrative purposes only, an individual that has rolled the non-automotive vehicle onto the support surface either by pushing the vehicle or riding the vehicle onto the surface, is aided in stepping off of the support surface by the side ramp in the extended position. In addition, it is appreciated that the side ramp in the retracted position covers and/or blocks the engine access opening such that the opening not hinder placing the vehicle onto the support surface.

The front ramp can have an upright extended position and a down extended position. In the upright extended position, the front ramp provides a generally vertical surface extending upwardly from a front portion of the support surface, the generally vertical surface operable for aiding and preventing the non-automotive vehicle from rolling off of the support surface. In the down extended position, the front ramp is an inclined surface extending from the front portion of the support surface to the floor surface and thereby providing a ramp that the vehicle can use to roll off of the support surface.

The process for servicing a non-automotive vehicle over a service pit can include providing a service pit with a top opening having a width, a non-automotive vehicle with an engine and a support. The support can be dimensioned to generally span across the width of the service pit top opening and to support and/or hold the vehicle over the pit. The support also has an engine access opening that allows access to the underside of the vehicle engine. The support and the non-automotive vehicle are placed over the service pit such that the support spans the width of the service pit top opening and supports and/or holds the vehicle over the service pit. The engine access opening of the support can be located underneath an underside of the vehicle engine and provide access to such components as the oil drain plug, oil filter and the like. After the support and the non-automotive vehicle have been placed over the service pit, the engine of the vehicle can e serviced. For example and for illustrative purposes only, an individual within the pit can remove the oil drain plug from the engine, allow at least part of any oil in the engine to be drained from the engine and then replace the oil drain plug. Thereafter, new oil can be put into the engine. It is appreciated that an oil filter of the engine can also be replaced. Thereafter, the vehicle can be removed from over the pit.

Any service pit can be used, including service pits at quick lube facilities such as those used at quick lube facilities known by the names Jiffy Lube™, Victory Lane Quick Oil Change®, Valvoline instant Oil Change, Pennzoil 10 Minute Oil Change and the like. In addition, for the purposes of the present invention, a support can be a plate, a cart, a dolly, a platform, a hoist and combinations thereof that support and/or hold the non-automotive vehicle over the service pit such that the vehicle can be serviced. As such, a support that is at least partially located within the service pit also falls within the scope of the present invention if as non-automotive vehicle is supported and/or held by the support over the service pit and the vehicle can be serviced while located there. Thus the process includes providing any structure that is operable to hold and secure a non-automotive vehicle over and/or at least partially within a service pit such that the vehicle can be at least partially serviced from underneath, the structure being held over the pit by mechanical means, electrical means and/or magnetic means.

Figure 2:
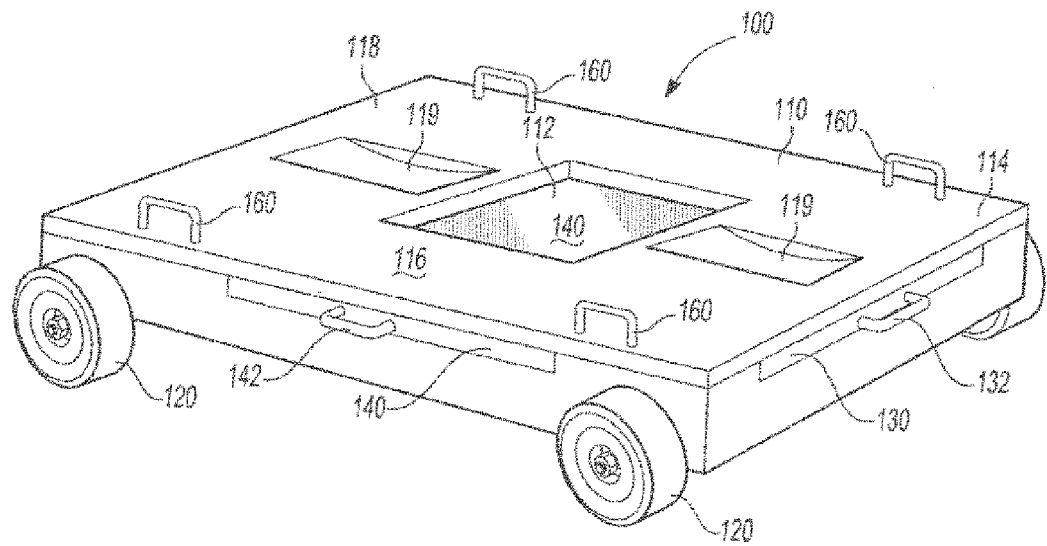
FIG. 2 is a rearward perspective view of the support shown in FIG. 1.
Figure 3:
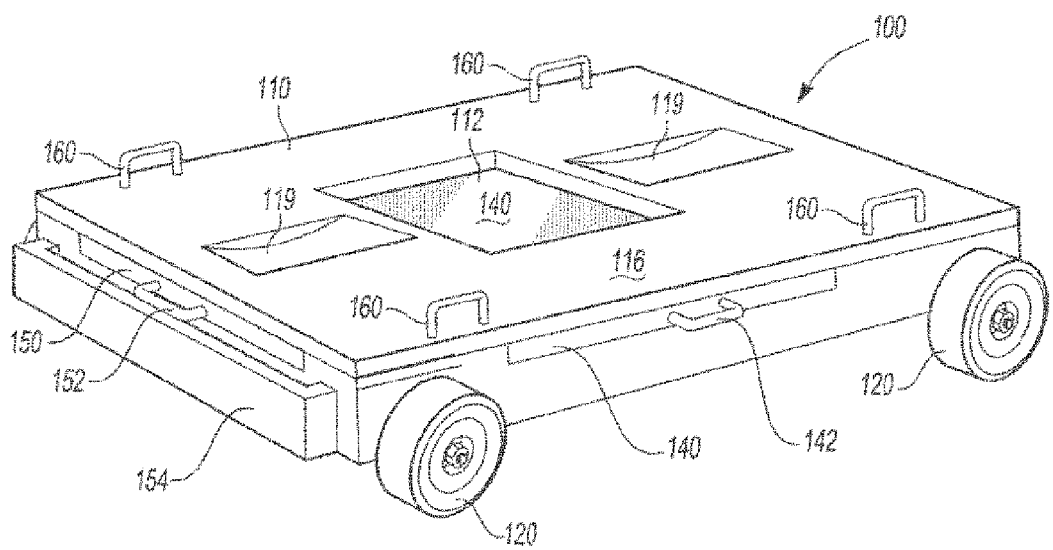
FIG. 3 is a frontward perspective view of the support shown in FIG. 1.

Turning now to FIGS. 1-3, an embodiment of a support is shown generally at reference numeral 10. The support 10 as shown in FIG. 1 has a non-automotive vehicle 70 thereon, with the support 10 and vehicle 70 located over a pit 60. It is appreciated that FIG. 1 illustrates a motorcycle for illustrative purposes only. The vehicle can be held securely on the support 10 using an attachment device 162, illustratively including a tie-down strap. In addition, a bracket and/or stand (not shown) can be included as part of the support 10, the bracket and/or stand operable to securely hold the vehicle 70. The pit 60 can he any kind of pit known to those skilled in the art that is used to service an automobile, truck and the like. In some instances the service pit can have a manual or automated mechanical means to move the support 10. For example and for illustrative purposes only, the pit 60 can optionally include a pulley 64 and a cable 66 that can he attached to the support 10 as illustrated in FIG. 1, the pulley 64 and cable 66 used to pull the support 10 over and/or off of the service pit 60. The pulley 64 can be band operated with a lever, powered by an electric motor and the like.

The support 10 can include, a support surface 100, the support surface 100 having an engine access opening 112, a rear portion 114, a side portion 116 and a front portion 118.

Although not required, an indentation 119 can be included such that a wheel of a non-automotive vehicle can fit at least partially within and provide a location for the vehicle to be parked. In addition, more than two indentations 119 can he provided. For example, an additional four indentations 119 can be provided such that wheels of a four-wheel vehicle could fit at least partially within. The support 10 can include a rolling mechanism. 120, illustratively including a plurality of wheels that afford for the support 10 to roll across a surface or floor F. The rolling mechanism is rotatably attached to the support 10 such that the support rolls across the floor F at a predetermined height. For example, if the service pit 60 has a lip 62 extending at least partially around the pit, the support 10 is dimensioned such that it can span the width of the pit 60 and roll over the lip 62 as illustrated in FIG. 1.

The support 10 can also include at least one ramp, for example and for illustrative purposes only a rear ramp 130, a side ramp 140 and a front ramp 150. The at least one ramp can have and he movable between a retracted position and an extended position. For example, the rear ramp 130, optionally having a handle 132, can have a retracted position as shown in FIG. 2 and an extended position as shown in FIG. 1. It is appreciated that the extended position of the rear ramp 130 provides an inclined surface extending from the rear portion 114 of the support surface 100 to the floor surface F. In this manner, the rear ramp 130 in the extended position provides an aid for rolling the non-automotive vehicle up onto the support surface 100.

The side ramp 140 with an optional handle 142 also has a retracted position as illustrated in FIG. 2 and an extended position as shown in FIG. 1. While in the retracted position, the side ramp 140 provides a cover and/or blocks the engine access opening 112. In this manner, the non-automotive vehicle 70 is not hindered by the engine access opening 112 when the vehicle is rolled onto the support surface 100. In the extended position, the side ramp 140 provides an inclined surface extending from the side portion 116 of the support surface 100 to the floor surface F. It is appreciated that an individual that has rolled or ridden the vehicle onto the support surface 100 can use the side ramp 140 in the extended position to step off of the support surface. It is further appreciated that the side ramp 140 in the extended position uncovers and/or unblocks the engine access opening 112 such that access to the underside of the engine of the vehicle 70 is provided.

The front ramp 150 with an optional handle 152 can have an upright extended position and a down extended position. In the upright extended position the front ramp 150 provides a generally vertical surface as illustrated in FIG. 1, the vertical surface providing an aid to prevent the non-automotive vehicle 70 from rolling off of the support surface 100. In the down extended position, the front ramp 150 provides an inclined surface extending from the front portion 118 of the support surface to the floor surface F. In this manner, the front ramp 150 in the down extended position aids in rolling the vehicle 70 off of the support surface 100. It is appreciated that the front ramp 150 can have one or more mechanisms that afford for the ramp to be placed into the upright extended position, the down extended position and the retracted position. For example and for illustrative purposes only, FIG. 3 illustrates a bracket 154 that holds the front ramp 150 in the generally vertical position once it has been pulled out from under the support surface 100.

Figures 4, 5:
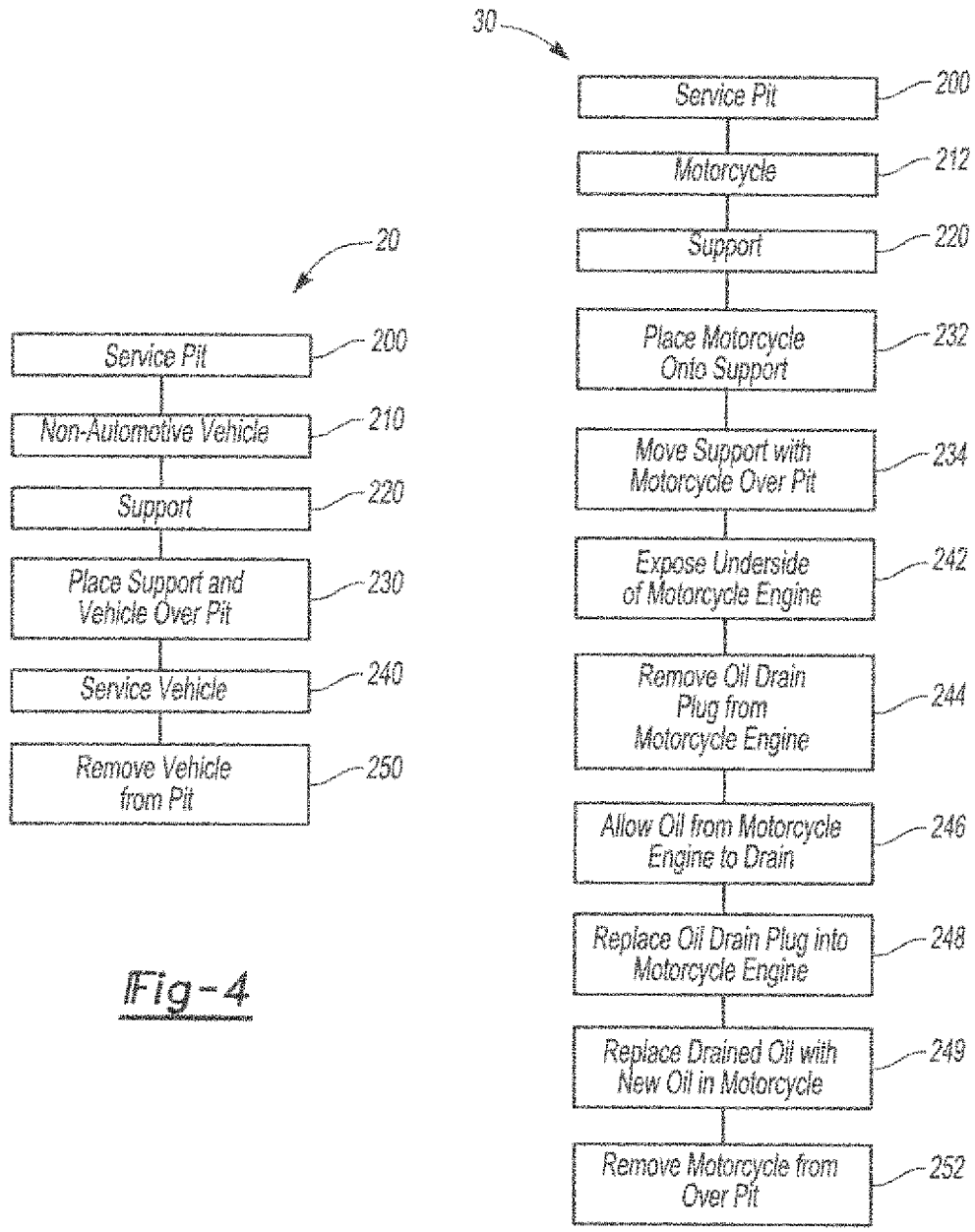
FIG. 4 is an embodiment of a process for servicing a non-automotive vehicle over a service pit.
FIG. 5 is another embodiment of a process for servicing a non-automotive vehicle over a service pit.

Turning now to FIG. 4, an embodiment for servicing a non-automotive vehicle over a service pit is shown generally at reference numeral 20. The process 20 includes providing a service pit at step 200 and a non-automotive vehicle, at step 210. A support is provided at step 220 and the support and vehicle are placed over the pit at step 230. It is appreciated that the vehicle can be placed on the support before the support is placed over the pit, or in the alternative, the support can be placed over the pit first, followed by the vehicle being placed onto the support. Thereafter, the vehicle is serviced at step 240 and then removed from over the service pit at step 250.

Turning now to FIG. 5, another embodiment for servicing a non-automotive vehicle over a service pit is shown generally at reference numeral 30. Similar to the process 20 discussed above, the process 30 includes providing a service pit at step 200 and a support at step 220. However, in the process 30 a motorcycle is provided at step 212. The motorcycle is placed onto the support at step 232 and the support with the motorcycle thereon is moved over the pit at step 234. The underside of the motorcycle engine is exposed at step 242 and the oil drain plug from the motorcycle engine is removed at step 244. At step 246, the oil from the motorcycle engine is allowed to drain and the oil drain plug is replaced at step 248. New oil is placed within. the motorcycle engine at step 249 and the motorcycle is removed from over the service pit at step 257.

Figure 6H:
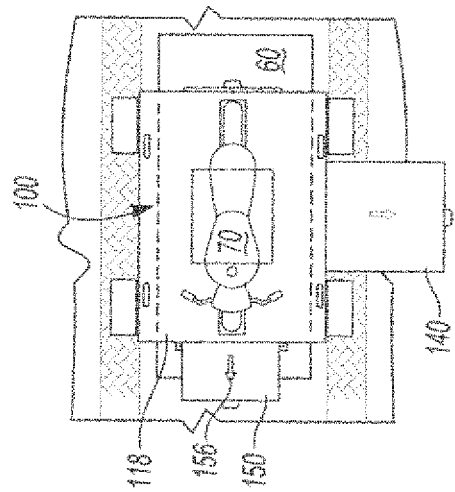
Figure 6G:
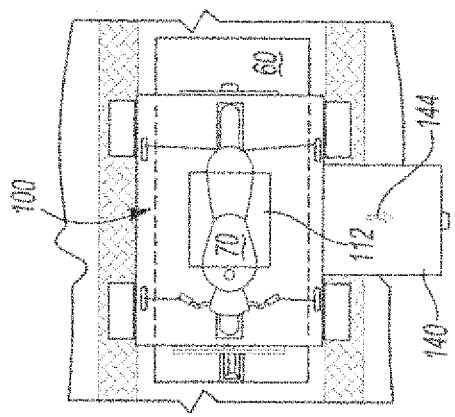

A process according to the embodiment 30 is illustrated in FIGS. 6A-6H using the support illustrated in FIGS. 1-3. As shown in FIG. 6A, the support 10 is located at one end of the service pit 60. In addition, the non-automotive vehicle 70 is located proximate to the rear portion 114 of the support surface 100. FIG. 6A also illustrates that all of the ramps of the support 10 are in the retracted position with the side ramp 140 covering and/or blocking the engine access opening 112. In FIG. 6B, the rear ramp 130 is placed into an extended position 134 and the vehicle 70 is rolled in a first direction 1. It is appreciated that the rear ramp 130 in the extended position 134 provides an inclined surface that extends from the rear portion 114 of the support surface 100 to the floor surface F. As shown in FIG. 6C, the vehicle 70 has been pushed up the rear ramp 130 and onto the support surface 100. It is appreciated that an individual can manually push the vehicle 70 up onto the support surface 100, or in the alternative, ride the vehicle 70 up onto the support surface 100.

Figure 6F:
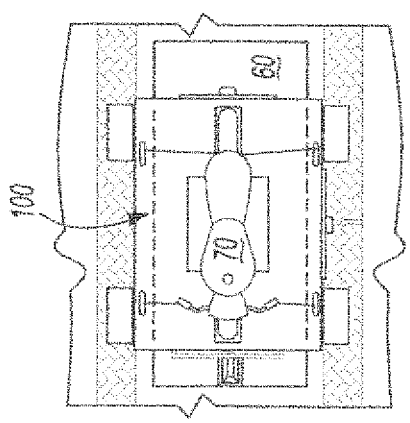

After placing the non-automotive vehicle 70 onto the support surface 100, a person P can use the side ramp 140 in the extended position 144 to step off of the support surface 100. In addition, the side ramp 140 in the extended position 144 uncovers and/or unblocks the engine access opening 112. After the person P has stepped off of the support surface 100, the support 10 with the vehicle 70 thereon can be moved in the first direction 1 as shown in FIG. 6E until the support 10 and the vehicle 70 are located over the service pit 60 as illustrated in FIG. 6F. If the side ramp 140 has been placed in he retracted position while the support 10 and vehicle 70 are placed over the service pit 60, the side ramp 140 can be placed in the extended position 144 again in order to allow access to the underside of the motorcycle engine through the engine access opening 112. Access to the underside of the motorcycle engine can afford for removal of the oil drain plug and/or the oil filter of the engine which allows oil in the engine to drain.

After oil from the vehicle engine has properly drained, the oil drain plug and/or oil filter can be replaced and new oil placed into the engine of the non-automotive vehicle 70. Thereafter, the front ramp 150 can he placed in the down extended position 156 and the vehicle 70 rolled off of the support surface 100. In the alternative, the support 10 with the vehicle 70 thereon can be rolled in the first direction 1 or in an opposite direction until the support 10 is no longer over the service pit 60 and then the vehicle 70 removed.

The support 10 can be made from any material known to those skilled in the art, illustratively including metals, plastics, rubber, wood, ceramics, and the like. The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following, claims, including all equivalents, which define the scope of the invention.

We claim:

1. A process for changing the oil of a motorcycle, the process comprising:
   providing a service pit with a top opening having a width;
   providing a motorcycle with an engine, the engine having an oil drain plug;
   providing a support, the support dimensioned to support the motorcycle and to generally span across the width of the service pit top opening, the support also having an engine access opening;
   placing the motorcycle onto the support with the oil drain plug located directly above the engine access opening;
   placing the support and the motorcycle over the pit such that the support spans the width of the top opening and supports the motorcycle over the service pit; and
   changing the oil of the motorcycle by removing the oil drain plug, draining oil from the engine, the oil flowing through the engine access opening of the support and into the service pit, replacing the oil drain plug and providing additional oil in the engine.

2. The process of claim 1, wherein the service pit is located at a quick lube facility.

3. The process of claim 1, wherein the support is selected from the group consisting of a plate, a cart, a dolly, a platform, a hoist and combinations thereof.

4. The process of claim 3, wherein the support is a cart with a support surface, the support surface having the engine access opening.

5. The process of claim 1, wherein the cart has spaced apart wheels that span the width of the service pit and the cart is rolled over the service pit after the motorcycle is placed onto the support surface.

6. The process of claim 5, wherein the cart with wheels has a rear ramp.

7. The process of claim 6, wherein the rear ramp in an extended position provides a surface that aids in rolling the non-automotive motor vehicle onto the support surface.

8. The process of claim 7, further including the cart having a side ramp and the side ramp in a retracted position provides a surface that blocks the engine access opening of the support surface and provides a surface for the motorcycle to roll over or across the engine access opening, and in an extended position unblocks the engine access opening and provides a surface for an individual to step off of the support surface.

9. The process of claim 6, further including the cart having a front ramp and the front ramp in an extended upright position provides a barrier that aids in preventing the non-automotive motor vehicle from rolling off of a front portion of the support surface.

10. The process of claim 9, wherein the front ramp in a down extended position provides a surface that aids in rolling the non-automotive motor vehicle off of the support surface.

11. The process of claim 1, wherein removing the motorcycle from over the service pit includes riding or pushing the motorcycle off of the support.

\* \* \* \* \*